(12) United States Patent
Parviainen

(10) Patent No.: US 10,273,118 B2
(45) Date of Patent: Apr. 30, 2019

(54) DEVICE AND METHOD PROVIDING TRAFFIC FORECASTS FOR ELEVATOR SYSTEMS

(71) Applicant: KONE Corporation, Helsinki (FI)

(72) Inventor: Aki Parviainen, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 135 days.

(21) Appl. No.: 15/359,233

(22) Filed: Nov. 22, 2016

(65) Prior Publication Data

US 2017/0073186 A1    Mar. 16, 2017

Related U.S. Application Data

(63) Continuation of application No. PCT/EP2014/061116, filed on May 28, 2014.

(51) Int. Cl.

| B66B 1/46 | (2006.01) |
|---|---|
| B66B 1/34 | (2006.01) |
| H04W 4/80 | (2018.01) |
| G06Q 10/06 | (2012.01) |
| B66B 3/00 | (2006.01) |

(Continued)

(52) U.S. Cl.
CPC .............. *B66B 1/468* (2013.01); *B66B 3/002* (2013.01); *B66B 5/0012* (2013.01); *G06Q 10/06* (2013.01); *G06Q 10/0631* (2013.01); *H04W 4/80* (2018.02); *B66B 2201/4615* (2013.01); *B66B 2201/4653* (2013.01); *H04W 84/12* (2013.01); *Y04S 10/54* (2013.01)

(58) Field of Classification Search
USPC ....................................................... 187/247
See application file for complete search history.

(56) References Cited

U.S. PATENT DOCUMENTS

| 4,370,717 A * | 1/1983 | Hummert ................ G09B 9/00 |
|---|---|---|
| | | 187/393 |
| 5,290,976 A * | 3/1994 | Bahjat ................... B66B 1/2408 |
| | | 187/293 |

(Continued)

FOREIGN PATENT DOCUMENTS

| CN | 102216194 A | 10/2011 |
|---|---|---|
| CN | 103204414 A | 7/2013 |
| WO | WO 2008/116963 A1 | 10/2008 |

OTHER PUBLICATIONS

Chinese Office Action dated Dec. 18, 2018 for corresponding Chinese Patent Application No. 201480079333.6.

*Primary Examiner* — Christopher Uhlir
(74) *Attorney, Agent, or Firm* — Birch, Stewart, Kolasch & Birch, LLP

(57) ABSTRACT

The invention relates to a device providing traffic forecasts for elevator systems, comprising a data-processing system, wherein the device is designed to establish a data connection between the data-processing system and the elevator system, and wherein the device is designed to establish a data connection between the data-processing system and at least one mobile device, and wherein the device is designed to receive data from the elevator system and/or from at least one mobile device, and wherein the device is designed to send processed data to at least one mobile device.

Figure 1:
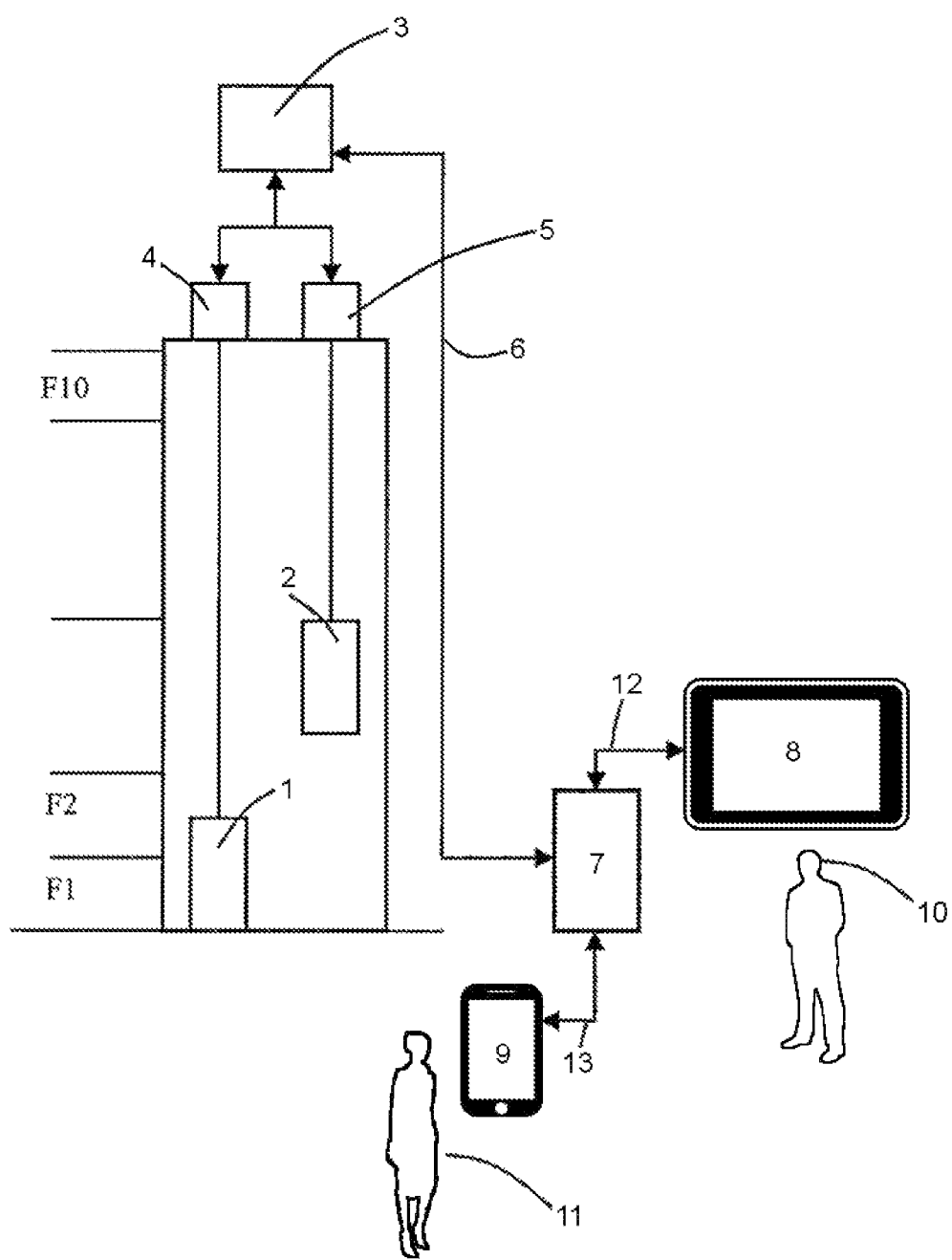

The invention further relates to a method providing traffic forecasts.

19 Claims, 2 Drawing Sheets

(51) Int. Cl.
    *B66B 5/00*      (2006.01)
    *H04W 84/12*    (2009.01)

(56)            References Cited

U.S. PATENT DOCUMENTS 8,348,021  B2 *   1/2013   Finschi .................. B66B 1/468
                                                    187/382
2007/0151809  A1 *   7/2007   Tyni ...................... B66B 1/468
                                                    187/391
2011/0174580  A1 *   7/2011   Tokura ................. B66B 1/2458
                                                    187/382
2011/0284329  A1 *  11/2011   Nakagawa ............ B66B 1/2458
                                                    187/382
2012/0279807  A1 *  11/2012   Finschi ................ B66B 1/2458
                                                    187/384
2013/0048436  A1 *   2/2013   Chan ................... B66B 1/2408
                                                    187/387

* cited by examiner

DEVICE AND METHOD PROVIDING TRAFFIC FORECASTS FOR ELEVATOR SYSTEMS

CROSS REFERENCE TO RELATED APPLICATIONS

This application is a Continuation of PCT International Application No. PCT/EP2014/061116, filed on May 28, 2014, the entire contents of which is herein explicitly incorporated by reference.

FIELD OF THE INVENTION

The invention relates to a device and a method providing traffic forecasts for elevator systems, especially providing information about travel time or waiting time. The invention further relates to an elevator system having implemented said device as well as a computer program carrying out the method.

BACKGROUND OF THE INVENTION

Regarding office buildings or similar estates, where many people work or live in one construction of many floors, there is a constantly changing traffic of people wanting to change the vertical position. Elevator systems in such buildings are used by different number of passengers at different times of day.

For example, concerning the above mentioned office building, there will be a high volume of traffic in the morning, when people arrive for work, followed by a time when the elevator system is frequented by only few passengers during the morning. At noon there probably will be a rush hour when people go to lunch and return to their offices, followed again by a calm time during noon and a high traffic in the evening when people leave their offices and go home.

Passengers who are independent regarding their time of travel would be advantageously using the elevator at times of low traffic to reduce as well waiting time as also travel time. It would be of an advantage for them to know the best travel-time.

Methods known in the art, that are used to determine the travelling and waiting time are based on data about the actual allocated destinations of elevator cars and their actual position. The results of a processing of this data are shown for passengers on some screens most likely arranged in the lobby.

Disadvantages of the known methods are the small dataset, the non-optimal presentation of results, the slow updating of results, and the therefore resulting inability to provide optimal forecasts for future travels optimally presented to potential passengers.

AIM OF THE INVENTION

The aim of the present invention is to disclose a solution, which eliminates or at least alleviates the one or more of the drawbacks occurring in prior-art solutions presented above, and to enable a person to easily determine the travelling situation and the best time for using the elevator system.

It is also an aim of the invention to disclose an elevator system which is optimized in regard to the prior art.

SUMMARY OF THE INVENTION

The device, the elevator system, the method and the program carrying out the method according to the invention and preferred embodiments are characterized by the claims, respectively. Some further inventive embodiments are also presented in the descriptive section and in the drawings of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. The features of the various embodiments of the invention can be applied within the scope of the basic inventive concept in conjunction with other embodiments.

The invention refers to a device providing traffic forecasts for elevator systems, comprising a data-processing system, wherein the device is designed to establish a data connection between the data-processing system and the elevator system, and wherein the device is designed to establish a data connection between the data-processing system and at least one mobile device, and wherein the device is designed to receive data from the elevator system and/or from at least one mobile device, and wherein the device is designed to send processed data to at least one mobile device.

The elevator system comprises at least one elevator car. However, the benefit of the invention is recognized best, if the elevator system comprises two or more elevator cars that can be moved independently.

Preferred mobile devices are phones, tablets, smart wristwatches, or any other mobile device which utilizes mobile operating software like Android, IOS or Windows Mobile.

The data-processing system comprises at least one unit that is able to process data, e.g. a computer or a microcontroller combined with a data storage.

The device, especially the data-processing system of the device, is designed to send processed data to at least one mobile device and/or to receive data from at least one mobile device. Since this is preferably accomplished in a wireless manner, the device or the data processing system preferably comprises means to establish a data connection between the data-processing system and at least one mobile device ("connect-to-mobile-means"), wherein preferred means are Bluetooth-means, WLAN-means or mobile communication means or other radio-means.

The data designed to be received from the mobile devices is especially the actual position of the mobile devices or requests for use of the elevator.

The device is preferably designed to receive such data from to at least one mobile device and to process this data.

The data designed to be sent to the mobile devices is especially a request for data, the waiting-time for an elevator car arriving at the requested floor, the calculated duration of the journey to the assigned destination or the general traffic situation as a kind of general overall status (e.g. green: "only light traffic", yellow: "moderate traffic" and red: "heavy traffic, prepare for some extra travel time").

The device is preferably designed to send such data to at least one mobile device.

The device itself or the data-processing system of the device is designed to send processed data to an elevator system and/or to receive data from an elevator system. The data connection could be wire-based or wireless. The device or the data processing system preferably comprises means to establish a data connection between the data-processing system and an elevator system ("connect-to-elevator-means"), wherein preferred means are data busses, serial or parallel interfaces ('wires'; e.g. USB), Bluetooth-means, WLAN-means or mobile communication means or other radio-means.

The data designed to be received from the elevator system is especially the actual car-position, the assigned destinations of each car, the requests for each car, the number of passengers in each car or the passengers waiting in the floors for one of the cars.

The device is preferably designed to receive such data from the elevator system and to process this data.

The data designed to be sent to the elevator system is especially a request for elevator-data, the identity of the mobile devices connected to the device or the receiver of actual traffic information.

The device is preferably designed to send such data to the elevator system.

The device is preferably designed to provide traffic forecasts for elevator systems by applying the following method or preferred embodiments of this method.

The method providing traffic forecasts for elevator systems, especially by using the device of the present invention, is based on the steps:
  receiving traffic information (data) from the elevator system and/or at least one mobile device,
  at a request for a traffic forecast, approximating the waiting time and/or the travel time to a selected destination from the received traffic information, and/or estimating the overall traffic situation,
  sending the traffic forecast at least to the user who sent the request by sending the respective data to at least the mobile device of the user.

By using this method the device provides useful information like the current traffic situation or estimated travel times between users' location and the elevator system. Therefore this solution enhances the vertical transport of people in the building.

In a preferred embodiment, the traffic data comprises data about the position of at least one, especially more than two people in the building of the elevator system ("Position data"). Position data could be received with means for automatic local approximate positioning in the mobile devices, preferably GPS data or similar data.

In a preferred case, the elevator system is designed to receive destination call-data that user give wirelessly with his personal device like a mobile phone, a tablet computer or other mobile remote devices. Especially, the call-data defines departure floor and destination floor. This option is designated as "RemoteCall" in the following.

A combination of the present invention with a Remote-Call-option provides the advantage that both, information and functionality (e.g. elevator calling) is possible via the same application.

In a preferred embodiment, where the traffic information at least comprises data about the already assigned destinations, and also the already received calls, the traffic forecast is calculated in that:
  if the sum of assigned destinations plus the already received calls is smaller than a predefined low-value, the traffic status is green (low traffic),
  if the sum of assigned destinations plus the already received calls exceeds the predefined low-value and is lower than a predefined high-value, the traffic status is yellow (moderate traffic),
  if the sum of assigned destinations plus the already received calls exceeds the predefined high-value, the traffic status is red (high traffic), In another preferred embodiment, where the traffic information at least comprises data about the position of the submitter, data about the position of the elevator cars as well as optionally data about the already assigned destinations and/or also the already received calls, the traffic forecast is calculated in that:
  the time for at least one of the elevator cars needed to reach the floor of the submitter, advantageously in the course of the scheduled travel program of the at least one elevator car, is calculated and sent to the submitter as estimated waiting time.

In addition, if the mobile device also is able to send calls to the elevator system (RemoteCall), this embodiment could advantageously be extended to also include this call information (at least data about the assigned destination) in the calculation and calculate the estimated time of journey. This could be especially achieved a similar way the waiting time is calculated.

In another preferred embodiment, where the traffic information at least comprises data about the traffic of a past time period, especially at least the past day or even the days of the past month or past year, the traffic forecast is calculated in that:
  the estimated traffic is calculated from the respective times of day from this data.

In a preferred embodiment, the traffic information is requested from the elevator system and/or the mobile devices right after a person requests a traffic forecast. This results in a forecast that is always up-to-date.

All possible combinations of the above methods to calculate a traffic forecast could be of advantage for special applications. The device is preferably designed to process the traffic information as described in one or more of the methods above.

Parts of this invention are especially also computer programs that are based on the method of this invention, especially computer programs on computer readable media (e.g. storage media, random access memories or information hardwired in hardware). These computer programs are especially "apps" created for mobile devices.

Advantages of the present invention are among others that no separate systems are needed to provide passengers with the travel forecast. The mobile devices carried by the passengers would be sufficient and the forecast can be received anywhere the passengers are, e.g. in their own office, at the apartment or in a restaurant.

Furthermore, the invention is able to provide constantly updated information and process information very efficiently.

LIST OF FIGURES

In the following, the invention will be described in detail by the aid of examples of its embodiments, wherein:

FIG. 1 outlines an elevator system comprising a preferred device.

Figure 2:
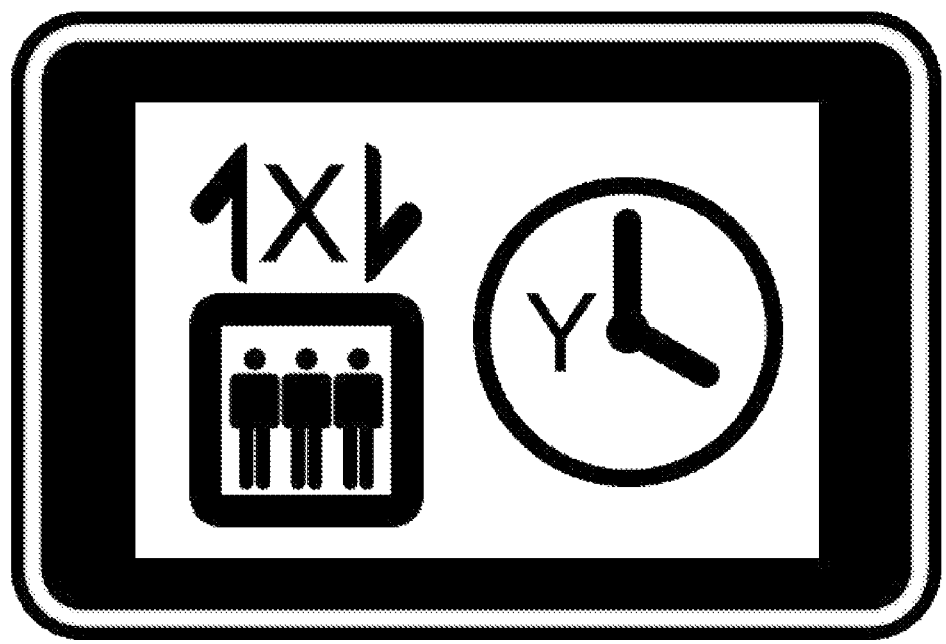

FIG. 2 demonstrates a possible traffic forecast on a mobile device.

DETAILED DESCRIPTION OF THE INVENTION

FIG. 1 outlines an elevator system comprising a preferred device 7 of the present invention. The elevator system forms an elevator group, which comprises two elevator cars 1 and 2, the elevator cars 1 and 2 are able to move in the elevator hoistway between the floors F1, F2 . . . F10. The elevator system is operated by processing device 3 that moves elevator car 1 via motor unit 4 and elevator car 2 via motor unit 5 and collects and processes data concerning the operation of the elevator system (destination selections, elevator calls, number of passengers per car, etc.). In addition, processing device 3 sends data over a data line 6 to the device 7 providing traffic forecasts. Optionally, the processing device 3 also receives data over a data line 6 from device 7.

In the figure, two persons are shown wherein persons 10 and 11 each have an individual mobile device 8 and 9 that are connected via wireless means to device 7 via data connections 12 and 13.

In this example, device 7 gathers traffic information comprising data about the position of the two elevator cars 1 & 2, the calls on each floor, and the calls made with mobile devices 8 and 9. If one of persons 10 or 11 starts a forecast request with mobile device 8 or 9, device 7 will send the required information on the respective mobile device. This information may be the waiting time and the time approximated for the journey (see also FIG. 2).

Assumed that the destination of person 10 is floor F2 and the destination of person 11 is floor F10, the waiting time may be the same, since both persons are shown on the ground floor.

However, the case could appear that the elevator system automatically assigns person 10 to elevator car 1, since it would be advantageous to use this car to reach floor F10 and person 11 could be assigned to elevator car 2. In this case, Persons 10 and 11 would receive different times for waiting.

A possible traffic forecast is outlined in FIG. 2. On the screen of a tablet computer—wherein the screen could also belong to a smartphone or another mobile device—there are two pictograms shown. The right pictogram in form of a clock showing the time Y the person has to wait until a called elevator car would arrive at the floor where the mobile device is located. Assumed the person already has chosen a destination, the left pictogram showing an elevator car and two arrows will show the time X a journey to this destination would require.

REFERENCE SIGNS

1 & 2 elevator cars
3 processing device
4 & 5 motor units
6 data line
7 device providing traffic forecasts
8 & 9 mobile devices
10 & 11 persons
12 & 13 wireless data lines

The invention claimed is:

1. A device providing traffic forecasts for an elevator system, comprising a data-processing system, the device being configured to:
   establish a data connection between the data-processing system and the elevator system;
   establish a data connection between the data-processing system and at least one mobile device;
   receive data from the elevator system and/or from the at least one mobile device, wherein the received data includes traffic information about already assigned destinations and already received calls;
   receive a request from a mobile device of a user, wherein the request is a traffic forecast request; and
   send processed data including at least the traffic forecast to the mobile device of the user based on the request,
   wherein the traffic forecast is calculated such that:
   if a sum of the assigned destinations plus the already received calls is smaller than a predefined low-value, a traffic status is green (low traffic),
   if the sum of the assigned destinations plus the already received calls exceeds the predefined low-value and is lower than a predefined high-value, the traffic status is yellow moderate traffic), and
   if the sum of assigned destinations plus the already received calls exceeds the predefined high-value, the traffic status is red (high traffic).

2. The device as claimed in claim 1, wherein the at least one mobile device is selected from a group of phones, tablets, smart wristwatches and mobile devices which utilize mobile operating software.

3. The device as claimed in claim 1, wherein the device is designed to send processed data to the at least one mobile device and/or to receive data from the at least one mobile device in a wireless manner, wherein the device or the data processing system establishes a data connection between the data-processing system and the at least one mobile device via Bluetooth, WLAN, mobile or radio communication.

4. The device as claimed in claim 1, wherein the device is designed to send processed data to the elevator system and/or to receive data from the elevator system via a wired or wireless connection.

5. The device as claimed in claim 1, wherein the elevator system is designed to receive destination call-data via wireless connection with a mobile device of a user, and
   wherein the call-data defines a departure floor and a destination floor and is designated as a RemoteCall-option.

6. A method providing traffic forecasts for an elevator system, comprising the steps of:
   receiving traffic information (data) from an elevator system of a building and/or at least one mobile device;
   receiving a traffic forecast request from a mobile device of a user;
   approximating a waiting time and/or travel time to a selected destination from the received traffic information, and/or estimating an overall traffic situation; and
   sending the traffic forecast at least to the user who sent the request by sending the respective data to at least the mobile device of the user,
   wherein the traffic information comprises data about already assigned destinations and already received calls, and
   wherein the traffic forecast is calculated such that:
   if a sum of the assigned destinations plus the already received calls is smaller than a predefined low-value, a traffic status is green (low traffic),
   if the sum of the assigned destinations plus the already received calls exceeds the predefined low-value and is lower than a predefined high-value, the traffic status is yellow (moderate traffic); and
   if the sum of assigned destinations plus the already received calls exceeds the predefined high-value, the traffic status is red (high traffic).

7. The method as claimed in claim 6, wherein the traffic information comprises position data of at least the user in the building of the elevator system, wherein the position data is received via an automatic local approximate positioning of the mobile device of the user.

8. The method as claimed in claim 6, wherein the traffic information comprises data about a position of the user requesting the traffic forecast, data about a position of a plurality of elevator cars, and data about the already assigned destinations and/or the already received calls, wherein the traffic forecast is calculated such that:

a time for at least one of the elevator cars needed to reach a floor of the user, in the course of a scheduled travel program of the plurality of elevator cars, is calculated and sent to the user as an estimated waiting time.

9. The method as claimed in claim 8, wherein the mobile device is further configured to send call information to remote devices (RemoteCall) of the elevator system designed to allow a RemoteCall-option, wherein the traffic information at least comprises the call information, and wherein the method further comprises calculating an estimated time of a journey.

10. The method as claimed in claim 6, wherein the traffic information comprises data about traffic of a past time period, wherein the traffic forecast is calculated such that:

the traffic forecast is calculated from the respective times of day from this data.

11. The method as claimed in claim 6, wherein the traffic information is requested from the elevator system and/or the mobile device immediately after a user requests a traffic forecast.

12. The method as claimed in claim 6, wherein the method is performed with a device providing traffic forecasts for elevator systems, comprising a data-processing system, wherein the device is designed to establish a data connection between the data-processing system and the elevator system, wherein the device is designed to establish a data connection between the data-processing system and at least one mobile device, wherein the device is designed to receive data from the elevator system and/or from the at least one mobile device, and wherein the device is designed to send processed data to the at least one mobile device.

13. An elevator system, comprising the device as claimed in claim 1.

14. A non-transitory computer readable medium comprising computer executable program code configured to instruct at least one computer to perform the method of claim 6.

15. The device as claimed in claim 2, wherein the device is designed to send processed data to the at least one mobile device and/or to receive data from the at least one mobile device in a wireless manner, wherein the device or the data processing system establishes a data connection between the data-processing system and the at least one mobile device via Bluetooth, WLAN, mobile or radio communication.

16. The device as claimed in claim 2, wherein the device is designed to send processed data to the elevator system and/or to receive data from the elevator system via a wired or wireless connection.

17. The device as claimed in claim 3, wherein the device is designed to send processed data to the elevator system and/or to receive data from the elevator system via a wired or wireless connection.

18. The device as claimed in claim 2, wherein the elevator system is designed to receive destination call-data via wireless connection with the mobile device of a user, and wherein the call-data defines a departure floor and a destination floor and is designated as a RemoteCall-option.

19. The device as claimed in claim 3, wherein the elevator system is designed to receive destination call-data via wireless connection with a mobile device of a user, and wherein the call-data defines a departure floor and a destination floor and is designated as a RemoteCall-option.

* * * * *